US005694242A

United States Patent [19]
Omi

[11] Patent Number: 5,694,242
[45] Date of Patent: Dec. 2, 1997

[54] MULTI-FUNCTION MICROSCOPE

[75] Inventor: Shoichi Omi, Tokyo, Japan

[73] Assignee: Lunax Company Limited, Ibaraki-ken, Japan

[21] Appl. No.: 656,635

[22] Filed: May 31, 1996

[51] Int. Cl.$^6$ .................................................. G02B 21/36
[52] U.S. Cl. .................................. 359/369; 353/39
[58] Field of Search ................................ 359/369, 368; 353/39

[56] References Cited

FOREIGN PATENT DOCUMENTS

| 922024 | 3/1995 | Japan . | |
|---|---|---|---|
| 925641 | 5/1995 | Japan . | |
| 788270 | 12/1957 | United Kingdom | 359/369 |

*Primary Examiner*—Jon W. Henry
*Attorney, Agent, or Firm*—Reid & Preist, L.L.P.

[57] ABSTRACT

A multi-function microscope has a stable overall configuration and is provided with a grip for easy transportation. Additionally, it is ergonomically designed and hence the viewer can use the ocular for a prolonged period of time without experiencing any strong fatigue. A multi-function microscope comprising a base section including a light source, a control section arranged above said base section and including a stage and an objective lens and a housing arranged above said control section and provided with a projection screen is characterized in that a grip is provided at an upper portion of the housing, an ocular mirror sleeve being swingably supported between a stored position where it is stored in said grip and an operating position where it is drawn out of said grip and a projection reflecting mirror is provided in such a way that it is movable between a position on the optical axis of the objective lens and a position off the optical axis and the light flux projected from the objective lens is led to said projection screen by way of said projection reflecting mirror when said projection reflecting mirror is on the optical axis of the objective lens and to the ocular section of said ocular mirror sleeve when said projection reflecting mirror is off the optical axis.

5 Claims, 5 Drawing Sheets

MULTI-FUNCTION MICROSCOPE

BACKGROUND OF THE INVENTION

1. Field of the Invention

This invention relates to a multi-function microscope capable of selecting an ocular mode and a projection mode for operation.

2. Prior Art

Known multi-function microscopes typically comprise an ocular section that can be replaced with a projection type optical system having a screen as in the case of a microscope disclosed in Japanese Design Registration No. 922024 patented to the inventor of the present invention.

Japanese Design Registration No. 925641 also patented to the inventor of the present invention describes a microscope provided with a projector as illustrated in FIG. 5 of the accompanying drawings, said microscope comprising a base 100 including an illumination light source (not shown) and carrying thereon a stage 102 and an objective lens section 104. A projection screen section 106 is arranged above the objective lens 104 and an ocular section 110 is projecting vertically upward through the projection screen section 106.

The former multi-function microscope is accompanied by a problem of instability because a projection type optical system having a screen is arranged at an upper area of the main body of a microscope which itself stands high. Additionally, with such an arrangement, it is impossible to use a large screen in order to allow a large magnification for the projection type optical system.

On the other hand, the projecting ocular section of the latter multi-function microscope provides a problem of inconvenience of transportation and storage. In addition, the optical axis of the ocular section is practically vertical and can give rise to a problem of tired eyes if the viewer is forced to use it for a prolonged period of time. Furthermore, the microscope is not provided with any grip and hence entails a trouble of holding it in both bands for transportation.

SUMMARY OF THE INVENTION

In view of the problems of the known multi-function microscopes, it is therefore an object of the invention to provide a multi-function microscope that is free from the above problems, has a stable overall configuration and is provided with a grip for easy transportation. Another object of the invention is to provide a multi-function microscope that is ergonomically designed and hence the viewer can use the ocular for a prolonged period of time without experiencing any strong fatigue.

According to the invention, the above objects are achieved by providing a multi-function microscope comprising a base section including a light source, a control section arranged above said base section and including a stage and an objective lens and a housing arranged above said control section and provided with a projection screen, characterized in that:

a grip is provided at an upper portion of the housing, an ocular mirror sleeve being swingably supported between a stored position where it is stored in said grip and an operating position where it is drawn out of said grip; and a projection reflecting mirror is provided in such a way that it is movable between a position on the optical axis of the objective lens and a position off the optical axis and the light flux projected from the objective lens is led to said projection screen by way of said projection reflecting mirror when said projection reflecting mirror is on the optical axis of the objective lens and to the ocular section of said ocular mirror sleeve when said projection reflecting mirror is off the optical axis.

In a preferred mode of carrying out the invention, said projection reflecting mirror is interlocked with said ocular mirror sleeve when it is moved out of and moved onto the optical axis of the objective lens.

In another preferred mode of carrying out the invention, said screen is removably fitted and capable of projecting images on a wall surface.

In still another preferred mode of carrying out the invention, said ocular section has an ocular reflecting mirror secured to said housing and said ocular reflecting mirror is arranged to reflect the light flux projected from said objective lens to the ocular section of the ocular mirror sleeve when it is located at the position drawn out of said grip.

Alternatively, in another preferred mode of carrying out the invention, said ocular section has an ocular reflecting mirror secured to said ocular mirror sleeve and said ocular reflecting mirror is arranged to reflect the light flux projected from said objective lens to the ocular section of the ocular mirror sleeve when it is located at the position drawn out of said grip.

Thus, according to the invention, there is provided a multi-function microscope that is free from the above problems, has a stable overall configuration and is provided with a grip for easy transportation. A multi-function microscope according to the invention is ergonomically designed and hence the viewer can use the ocular for a prolonged period of time without experiencing any strong fatigue.

DESCRIPTION OF THE PREFERRED MODES OF CARRYING OUT THE INVENTION

Figure 1:
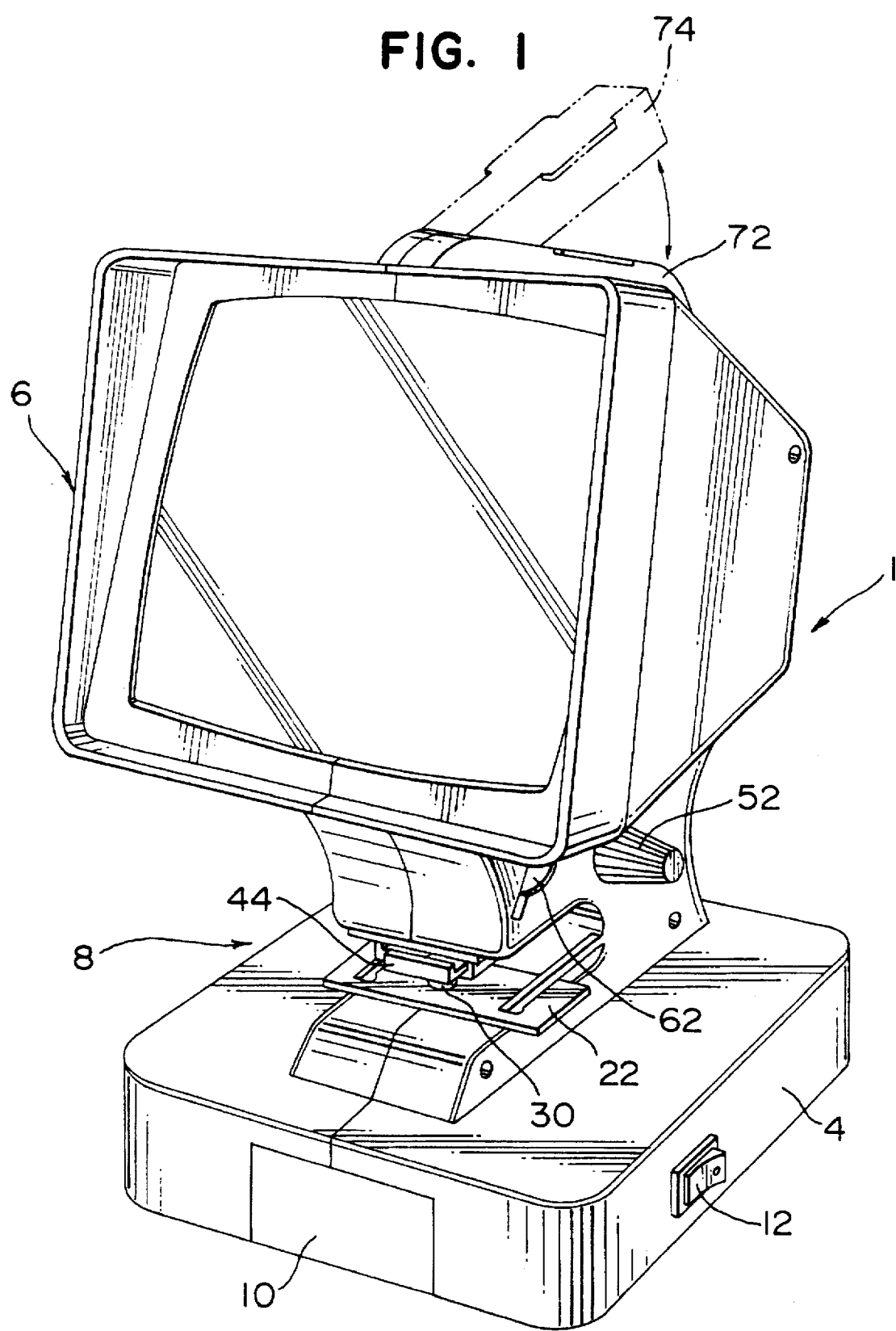
FIG. 1 is a schematic perspective view of a preferred embodiment of multi-function microscope according to the invention as viewed from the front side thereof.
Figure 2:
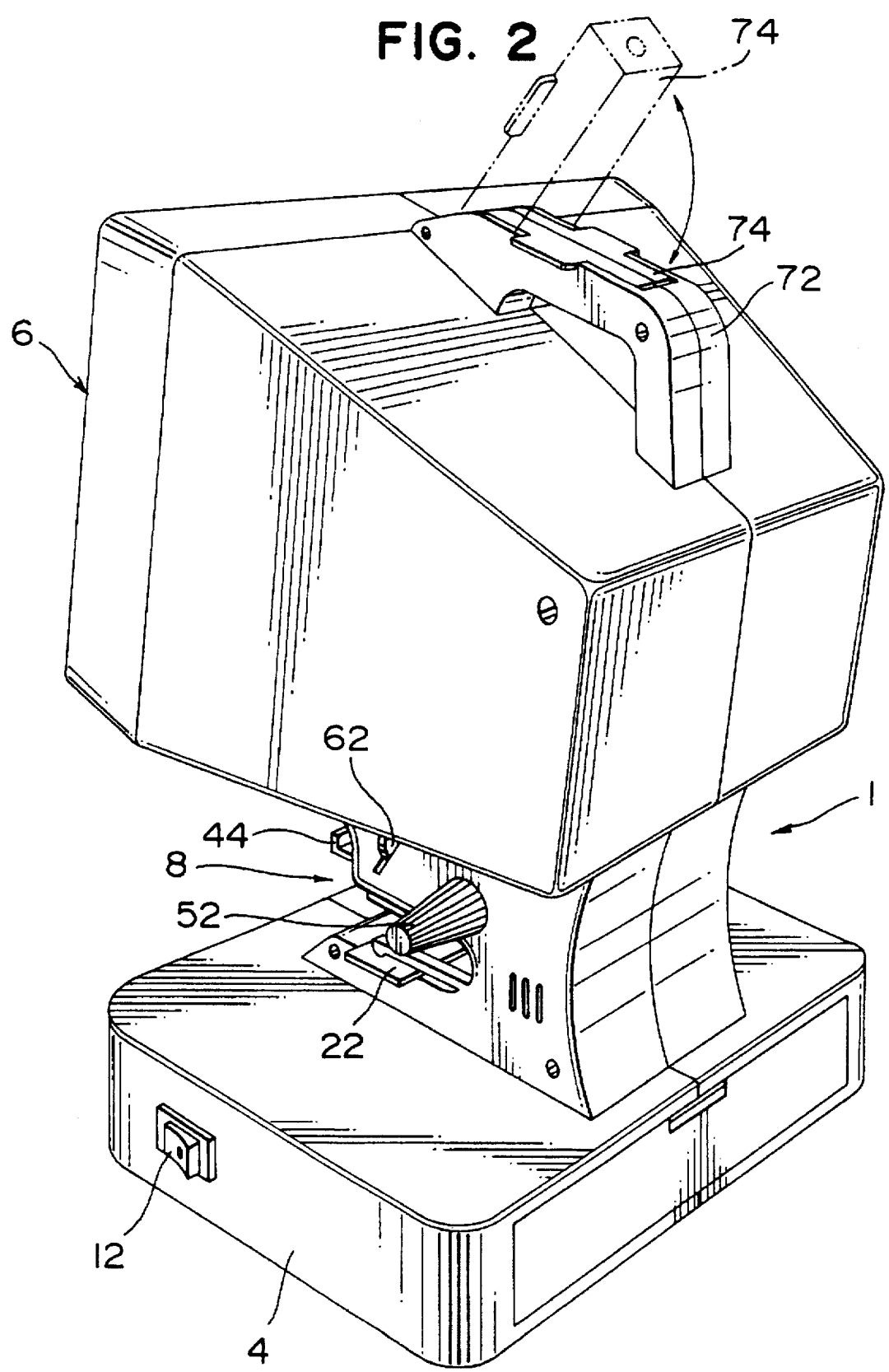
FIG. 2 is a schematic perspective view of the preferred embodiment of multi-function microscope according to the invention as viewed from the rear side thereof.
Figure 3:
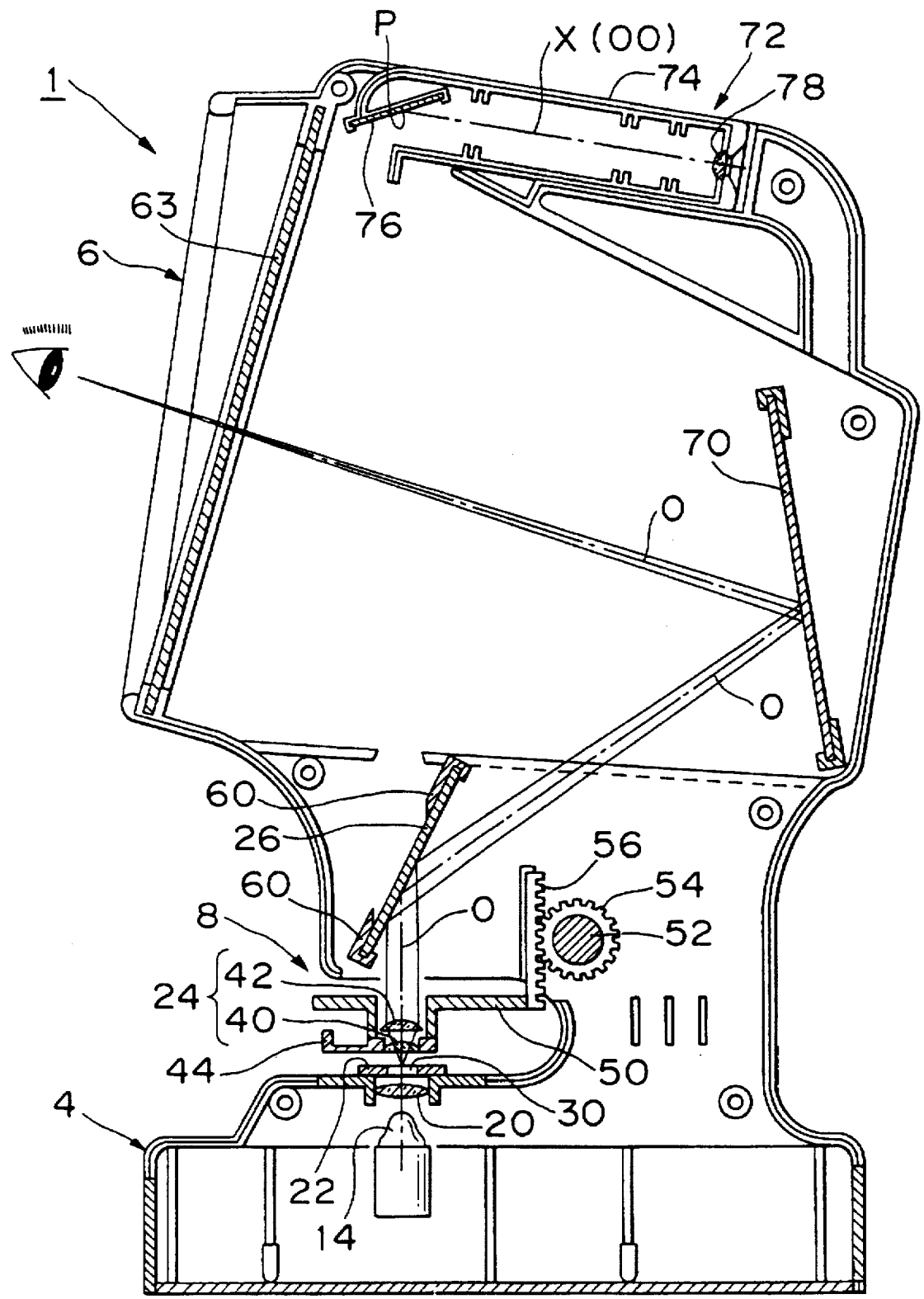
FIG. 3 is a vertical sectional view of the preferred embodiment of multi-function microscope according to the invention and taken along the central axis thereof in a projection mode of operation.
Figure 4:
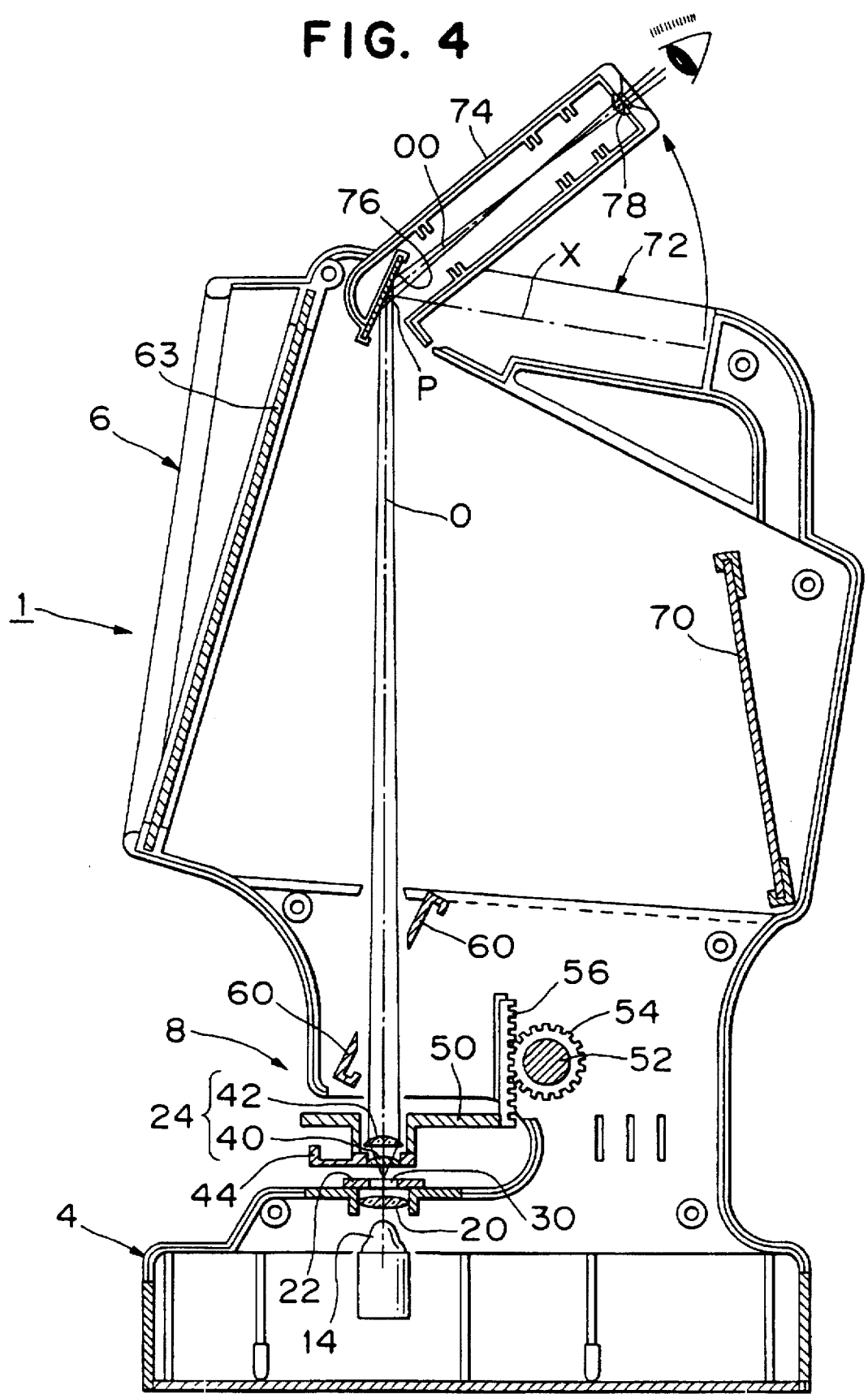
FIG. 4 is a vertical sectional view of the preferred embodiment of multi-function microscope according to the invention and taken along the central axis thereof in an ocular mode of operation.
Figure 5:
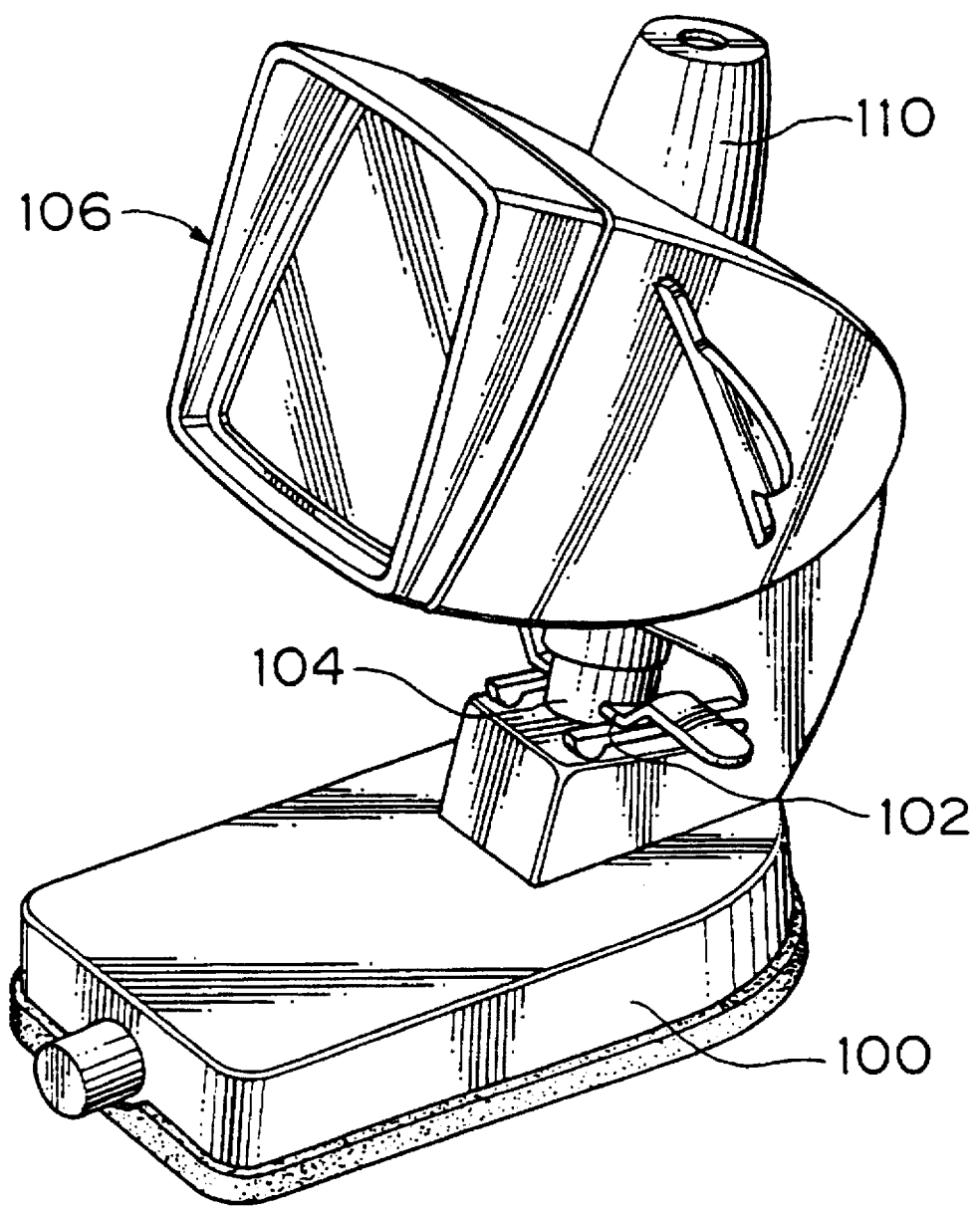
FIG. 5 is a schematic perspective view of a known multi-function microscope.

Now, preferred modes of carrying out the invention will be described by referring to the accompanying drawings. As shown in FIGS. 1 and 2, a multi-function microscope 1 of the invention comprises a base section 4, a housing 6 having a profile like that of the housing of an optical screening apparatus and a control section 8 arranged between the upper housing 6 and the lower base section 4. The base section 4 is provided on the front side thereof with a drawer 10 for storing accessories and on a lateral side thereof with a light source switch 12. As shown in FIGS. 3 and 4, a nipple bulb type light source lamp 14 and a condenser lens 20 with a focal length of 30 mm are arranged on the objective optical axis O.

The control section 8 includes a stage 22 and an objective lens 24. The stage 22 is provided with an aperture 30 around the objective optical axis O.

The objective lens 24 has a two-group lens configuration and comprises a replaceable lower first lens 40 and a fixed upper second lens 42 with a focal length of 30 mm. The first lens 40 and the second lens 42 are supported by an objective lens support arm 50, which objective lens support arm 50 is coupled with a vertical rack 56 held in engagement with a pinion 54 that is rigidly secured to a focusing knob 52. Either a short focal lens with a focal length of 5.0 m or a long focal lens with a focal length of 12.0 mm may selectively be brought onto the objective optical axis O for the first lens 40 by operating a magnification switch lever 44. The focal length of the objective lens is 4.3 mm, which corresponds to a magnification of 60 when the short focal lens is selected, whereas the focal length of the objective lens is 8.6 mm, which corresponds to a magnification of 30 when the long focal lens is selected.

The projection reflecting mirror 26 is slidably supported on a pair of horizontal rails 60 arranged respectively near the lateral walls of the housing 6. The projection reflecting mirror 26 can be moved between a position on the objective optical axis O as shown in FIG. 3 for operating for a projection type microscope and a position off the objective optical axis O as shown in FIG. 4 for operating for an ocular type microscope by horizontally maneuvering a projection reflecting mirror control handle 62. A milk white screen 63 is arranged on the front side of the housing 6 and a stationary reflecting mirror 70 is arranged at a rear position in the housing 6.

A grip 72 is arranged on the top of the housing 6 in such a way that an ocular mirror sleeve 74 is arranged swingably around the intersection P of the central axis X of the grip 72 and the objective optical axis O. The ocular mirror sleeve 74 is swingable between a stored position where it is stored within the grip 72 as shown in FIG. 3 and an operating position where it is drawn out of the grip 72 as shown in FIG. 4. The ocular mirror sleeve 74 contains therein an ocular reflecting mirror 76 having a reflecting plane where the intersection P is located and is designed to produce an ocular optical axis OO and an ocular lens 78 having a magnification of 5 and arranged at the front end of the ocular mirror sleeve 74.

A multi-function microscope according to the invention and having a configuration as described above operates in a manner as described below. When it is used as an ocular type microscope, the ocular mirror sleeve 74 is drawn out of the grip 72 as shown in FIG. 4 to produce an ocular optical axis OO there so that the flux of light coming along the objective optical axis O is reflected by the ocular reflecting mirror 76 and proceeds along the ocular optical axis OO. Then, the projection reflecting mirror 26 is placed off the objective optical axis O as shown in FIG. 4. A desired magnification can be set for the objective lens by selecting an appropriate lens for the first lens 40 and placing it on the objective optical axis O by means of the magnification switch lever 44. The object of microscopic observation is put to focus by means of the focusing knob 52.

When, on the other hand, it is used as a projection type microscope, the ocular reflecting mirror 74 is put into the grip 72. The projection reflecting mirror 26 is placed on the objective optical axis O by operating the projection reflecting mirror control handle 62. Then, a desired magnification can be set for the objective lens by selecting an appropriate lens for the first lens 40 and placing it on the objective optical axis O by means of the magnification switch lever 44. The object of microscopic observation is put to focus by means of the focusing knob 52.

The above described embodiment may be modified in such a way that the ocular reflecting mirror 74 and the projection reflecting mirror 26 are interlocked by means of a link mechanism or a wire mechanism to eliminate the necessity of using a projection reflecting mirror control handle. With such an arrangement, the ocular type microscope can be switched to the projection type microscope simply by putting the ocular mirror sleeve 74 into the grip 72.

The above embodiment may alternatively be so modified that the ocular reflecting mirror 76 is rigidly secured to the housing 6. With such an arrangement, the ocular mirror sleeve may have a very simple configuration.

What is claimed is:

1. A multi-function microscope comprising a base section including a light source, a control section arranged above said base section and including a stage and an objective lens and a housing arranged above said control section and provided with a projection screen, characterized in that:

a grip is provided at an upper portion of the housing, an ocular mirror sleeve being swingably supported between a stored position where it is stored in said grip and an operating position where it is drawn out of said grip; and a projection reflecting mirror is provided in such a way that it is movable between a position on the optical axis of the objective lens and a position off the optical axis and the light flux projected from the objective lens is led to said projection screen by way of said projection reflecting mirror when said projection reflecting mirror is on the optical axis of the objective lens and to the ocular section of said ocular mirror sleeve when said projection reflecting mirror is off the optical axis.

2. A multi-function microscope according to claim 1, characterized in that said projection reflecting mirror is interlocked with said ocular mirror sleeve when it is moved out of and moved onto the optical axis of the objective lens.

3. A multi-function microscope according to claim 1, characterized in that said screen is removably fitted and capable of projecting images on a wall surface.

4. A multi-function microscope according to claim 1, characterized in that said ocular section has an ocular reflecting mirror secured to said housing and said ocular reflecting mirror is arranged to reflect the light flux projected from said objective lens to the ocular section of the ocular mirror sleeve when it is located at the position drawn out of said grip.

5. A multi-function microscope according to claim 2, characterized in that said ocular section has an ocular reflecting mirror secured to said ocular mirror sleeve and said ocular reflecting mirror is arranged to reflect the light flux projected from said objective lens to the ocular section of the ocular mirror sleeve when it is located at the position drawn out of said grip.

* * * * *